United States Patent [19]

Ardley et al.

[11] Patent Number: 4,797,301

[45] Date of Patent: Jan. 10, 1989

[54] METHOD OF AND APPARATUS FOR APPLYING A FLUID TO A BULK COMMODITY

[75] Inventors: John H. Ardley, Neutral Bay; Brett A. Smith, Five Dock; Alison W. Nicholls, Pennant Hills, all of Australia

[73] Assignee: Wellcome Australia Limited, Australia

[21] Appl. No.: 98,272

[22] Filed: Sep. 18, 1987

[30] Foreign Application Priority Data

Sep. 22, 1986 [AU] Australia .............................. PH08142

[51] Int. Cl.$^4$ .................... B05D 1/02; B05C 11/00; B05C 5/00; B05B 17/00
[52] U.S. Cl. ........................................ 427/8; 118/303; 118/679; 118/683; 118/684; 427/424
[58] Field of Search ............... 118/679, 683, 684, 303; 427/212, 8, 424, 425

[56] References Cited

U.S. PATENT DOCUMENTS 3,138,482 6/1964 Gehl ................................ 118/303 X Primary Examiner—Michael Lusignan
Attorney, Agent, or Firm—Ostrolenk, Faber, Gerb & Soffen

[57] ABSTRACT

An apparatus for applying a fluid such as an insecticide to grain or similar material that is carried by a conveyor. A flap device which is formed from a sheet of resilient flexible material is pivotably mounted at one of its ends to a supporting structure which is located above the conveyor, and the flap device is positioned to contact and ride over the material that is carried by the conveyor. A distributor extends across the width of the flap device and includes a series of distribution channels which open to a lower surface of the flap device. The fluid is delivered to the distributor and is directed into the material which, in being carried by the conveyor, is contacted by the flap device. A sensing device is incorporated in the apparatus for detecting the degree of pivotal movement of the flap device as it rides over the material on the conveyor and, thus, for providing a measure of the quantity of material on the conveyor.

9 Claims, 4 Drawing Sheets

METHOD OF AND APPARATUS FOR APPLYING A FLUID TO A BULK COMMODITY

FIELD OF THE INVENTION

This invention relates to a method of and apparatus for applying a fluid to a bulk commodity on a conveyor. The invention has particular use in the application of insecticides, pesticides and fungicides or the like to grain whilst it is being conveyed on a travelling conveyor to a silo, and the invention is hereinafter described in the context of such an application. However, it will be understood that the invention does have broader application, in the context of applying any required fluid medium to any bulk material which is carried by any type of conveyor.

BACKGROUND OF THE INVENTION

Grain products such as wheat, barley, oats, sorghum, maize and oil seeds are usually treated prior to storage with a protectant solution. Diluted protectant concentrates are sprayed onto the product whilst it is being conveyed into storage, the solution being directed onto the product from a spray head which is located above the conveyor. The solution is pressurised and delivered to the spray head by a pump, and a solenoid actuated valve is provided for admitting the solution to the spray head when grain is sensed to be present on the conveyor. Sensing of the grain is effected by a hinged flap which is located in the conveyor path, the flap being caused to hinge upwardly when grain is present on the conveyor and the upward movement of the flap being used to cause actuation of the solenoid valve. The spray head is usually located upstream of the hinged flap and, thus, a small volume of grain passes the spray head before it is sensed to be present on the conveyor.

A number of problems arise from the use of the existing system. Firstly, even though low-toxic grain protectants may be used, there is a concern for the occupational health and safety of persons who are exposed to aerosol particles from the spray solutions in an enclosed work environment. Secondly, operator errors can occur when diluting chemicals with water. Thirdly, copious amounts of water are required for dilution. Fourthly, as in the case of most spray systems, the fine liquid droplets tend to be dispersed and it has been found that chemical losses of up to thirty per cent can be experienced. Quite apart from the increased operating costs that flow from these losses, the dispersion of spray may lead to inadequate dosing or, if overcompensation occurs, to excessive dosing of grain. Also, corrosion of plant and machinery may occur as a result of chemical dispersion into a closed environment.

The present invention seeks to overcome or diminish these problems by providing an arrangement in which a required fluid is supplied directly to a bulk commodity which is to be exposed to the fluid.

SUMMARY OF THE INVENTION

Thus, the invention provides an apparatus for applying a fluid to a material which is carried by a conveyor, the apparatus comprising a flap device located adjacent the conveyor and positioned to contact material carried by or discharged from the conveyor. A distributor extends across at least a portion of the width of the flap device and is arranged to direct fluid into the material which is contacted by the flap device, and means are provided for delivering the fluid to the distributor. Also, means are provided for sensing the existence of material on the conveyor and for admitting the fluid to the distributor responsive to the sensing of material on the conveyor.

In contrast with the known prior art, the present invention is directed to an apparatus which functions to apply the fluid directly to the material on the conveyor. The fluid is delivered by way of the flap device, which is maintained in contact with the material, and, thus, the fluid cannot be dispersed other than into the material. The fluid would normally comprise a liquid but it may comprise other flowable materials such as powder, gas or vapour. Also, because the fluid is applied directly to the material and is not dispersed into the surrounding atmosphere, it may be admitted to the material in a concentrated form.

The invention may also be defined in terms of a method of applying a fluid to a bulk material which is carried by a conveyor and wherein the fluid is directed into the material by way of a distributor on a flap device. The flap device is located adjacent the conveyor and is positioned such that it contacts the material carried by or delivered from the conveyor. The fluid is delivered to the distributor responsive to the material being sensed to be present on the conveyor.

PREFERRED FEATURES OF THE INVENTION

The flap device preferably is located above the conveyor and is positioned to overlie the conveyor. Thus, the material will then contact the underside of the flap device, causing the flap device to adjust to the height of the material. However, in an alternative arrangement, the flap device may be located at the discharge end of the conveyor and be located below the material when it is discharged from the conveyor. In this case the flap device will be biased upwardly against the underside of the material stream and the fluid will be directed into the material as it passes over the flap device.

The flap device preferably comprises or includes a sheet of flexible material, such as a synthetic rubber, and it preferably is pivotably mounted at one end to a supporting structure. Furthermore, the flap device itself is preferably used as the means for sensing the presence of material on the conveyor. Thus, as the flap device is caused to rise and move over material which is on the conveyor, its pivotal movement may be used to actuate an electric or pneumatic control device. Also, the quantity of material on the conveyor may be determined by measuring the degree of pivotal movement that is imparted to the flap device as it rides over the material.

The distributor may be mounted to the flap device or be moulded into the device as a component part. The distributor preferably extends across a major portion of the width of the flap device and in a direction transverse to the direction of movement of the conveyor.

The flow of fluid to the distributor may be controlled by a valve, (for example, a solenoid actuated valve) or by switching a pump as and when required Metering of the fluid to the apparatus is preferably controlled by a microprocessor or other controller which provides a pump controlling output signal which is determined by a number of input variables. The input variables will include some or all of the following:

1. The velocity of the conveyor.
2. The quantity of material carried by the conveyor, measured in terms of the depth of material on the conveyor.

3. The required dose rate for the material in terms of, for example, liters of fluid per tonne of material.
4. The flow volume or rate of fluid delivered to the distributor.
5. The back pressure of fluid in the pump circuit.
6. The electrical load demand of the conveyor or an elevator which is fed by the conveyor.

The invention will be more fully understood from the following description of a preferred embodiment of an apparatus which may be employed for applying a liquid grain protectant to a grain which is conveyed to a storage site such as a bunker or a silo. The invention is described with reference to the accompanying drawings.

DETAILED DESCRIPTION OF THE INVENTION

Figure 1:
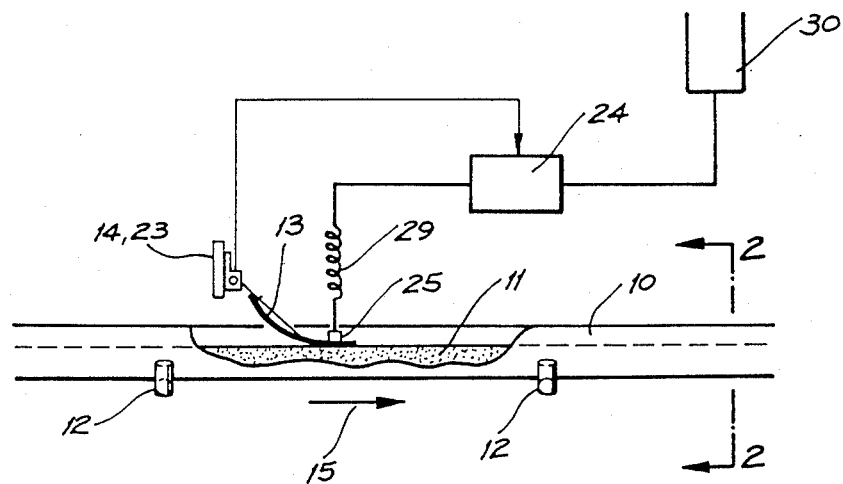
FIG. 1 shows a diagramatic representation of a portion of a conveyor belt and the liquid application apparatus located above the conveyor.
Figure 2:
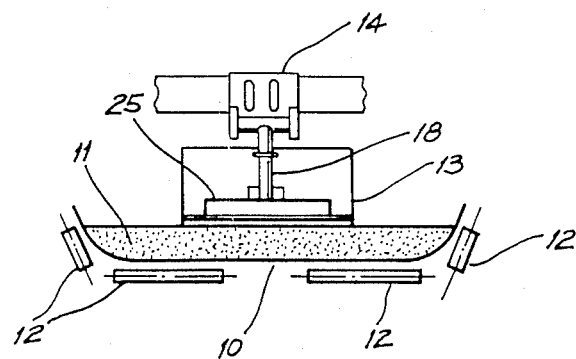
FIG. 2 shows an end elevation view of a portion of the arrangement shown in FIG. 1, the view being taken in the direction of section plane 2—2 as shown in FIG. 1.
Figure 3:
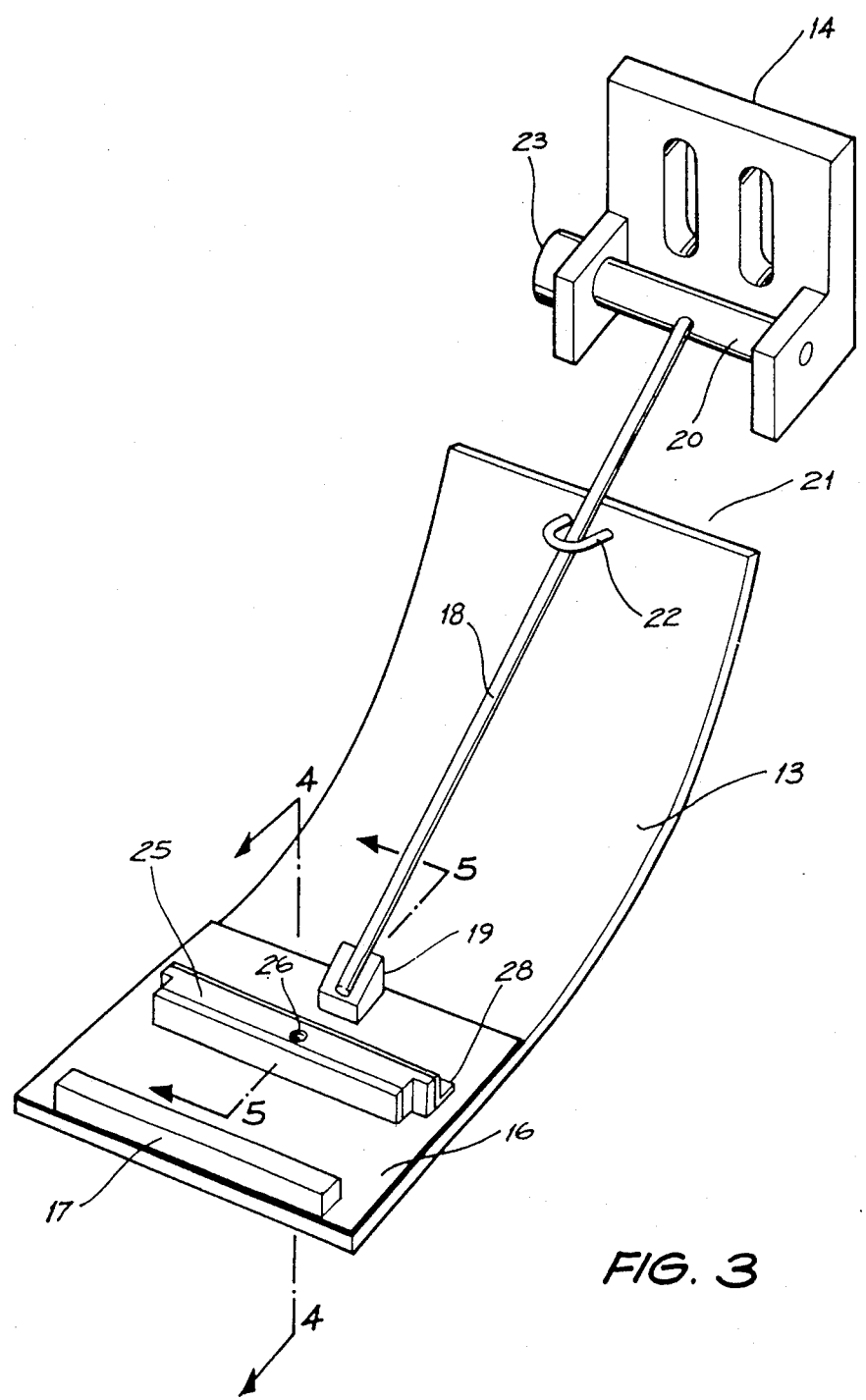
FIG. 3 shows a perspective view on an enlarged scale of a flap device which is incorporated in the apparatus of FIG. 1, the flap device including a distributor mounted thereto.
Figure 4:
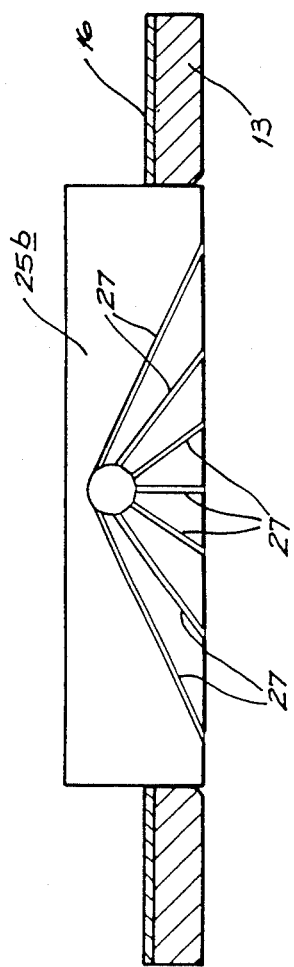
FIG. 4 shows a sectional elevation view of the distributor as seen in the direction of section plane 4—4 in FIG. 3.
Figure 5:
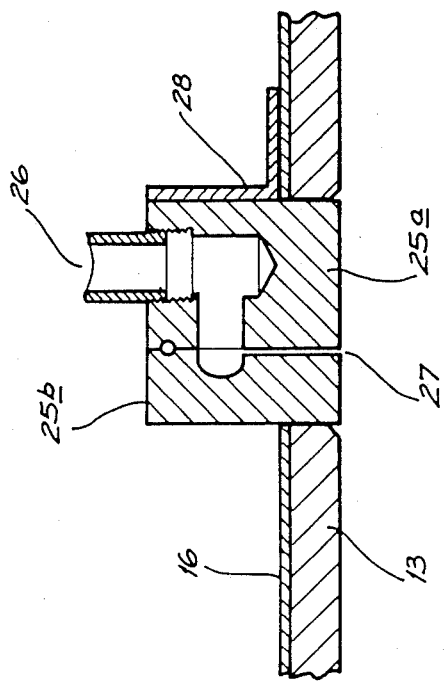
FIG. 5 shows a further sectional elevation view of the distributor, as seen in the direction of section plane 5—5 in FIG. 4.

As illustrated, the apparatus includes a grain conveyor 10 of a type which is suitable for transporting grain 11 from a freight car to a silo bucket elevator. The conveyor 10 is carried by support rollers 12 and by a frame structure (not shown) which carries the rollers.

The apparatus which is employed for applying the protectant solution to the grain is mounted above the conveyor and comprises a flap device 13 which extends downwardly from a mounting structure 14. The flap device 13 projects forwardly of the structure 14 in the direction of movement of the conveyor, the conveyor movement direction being indicated by the arrow 15 in FIG. 1.

The flap device 13 is formed from a flexible resilient sheet material such as a synthetic rubber or polyurethane and it has a width less than that of the conveyor 10. Typically the width of the flap device 13 will be equal to one third of the width of the conveyor.

The upper surface of the flap device 13 is clad at one end with a sheet of metal 16, such as stainless steel or aluminium, which serves to maintain that end of the flap device in a flat condition. A metal weight in the form of a steel bar 17 is secured to the free end of the flap device and serves to hold the device against the surface of the grain during passage of the conveyor.

A metal rod 18 is connected to the sheet 16 by way of a mounting block 19, and the rod 18 is connected to a rotatable shaft 20 which is carried by the mounting structure 14. The rod 18 is connected to the upper end 21 of the flap device 13 by way of a U-bolt 22, which facilitates relative movement between the rod and the upper end of the flap device. Thus, the complete flap device is pivotable about the axis of rotation of the shaft 20.

As indicated in FIG. 1, an electrical control device (e.g. a potentiometer) 23 is associated with the mounting structure 14, and when the flap device pivots upwardly to a predetermined extent, the control device 23 is acutated to initiate operation of a pump 24.

The flap device 13 extends downwardly from the mounting structure 14 and, in the absence of any grain on the conveyor, the flap device assumes a lower pivotal position. Although not shown in the drawings, a helical tension spring may be used to support the lower end of the flap such that it is held a few millimetres above the level of the conveyor when no material is actually being carried by the conveyor. The spring serves to protect the underside of the flap device and the conveyor from excessive wear when the conveyor is running and no material is carried by the conveyor.

When grain is present on the conveyor, the flap device pivots upwardly to overlay the upper surface of the grain. In pivoting upwardly, the flap device 13 functions to sense the presence of grain on the conveyor and initiates actuation of the pump 24.

A distributor 25 is mounted to the flap device 13 and extends across the device in the direction transverse to the direction of travel of the conveyor. The distributor 25 comprises a two-part metal bar-like structure 25a, b and it includes a central inlet port 26 and a series of downwardly extending distributor channels 27. The distributor 25 is recessed into the flap device 13, such that the distributor channels open to the underside of the flap device. Thus, the bottom of distributor 25 lies flush with the underside of the flap device 13 and fluid which is forced through the distributor channels 27 is actually wiped onto the surface of the grain that is contacted by the flap device. An L-shaped mounting bracket 28 is employed for mounting the distributor to the flap device.

Figure 6:
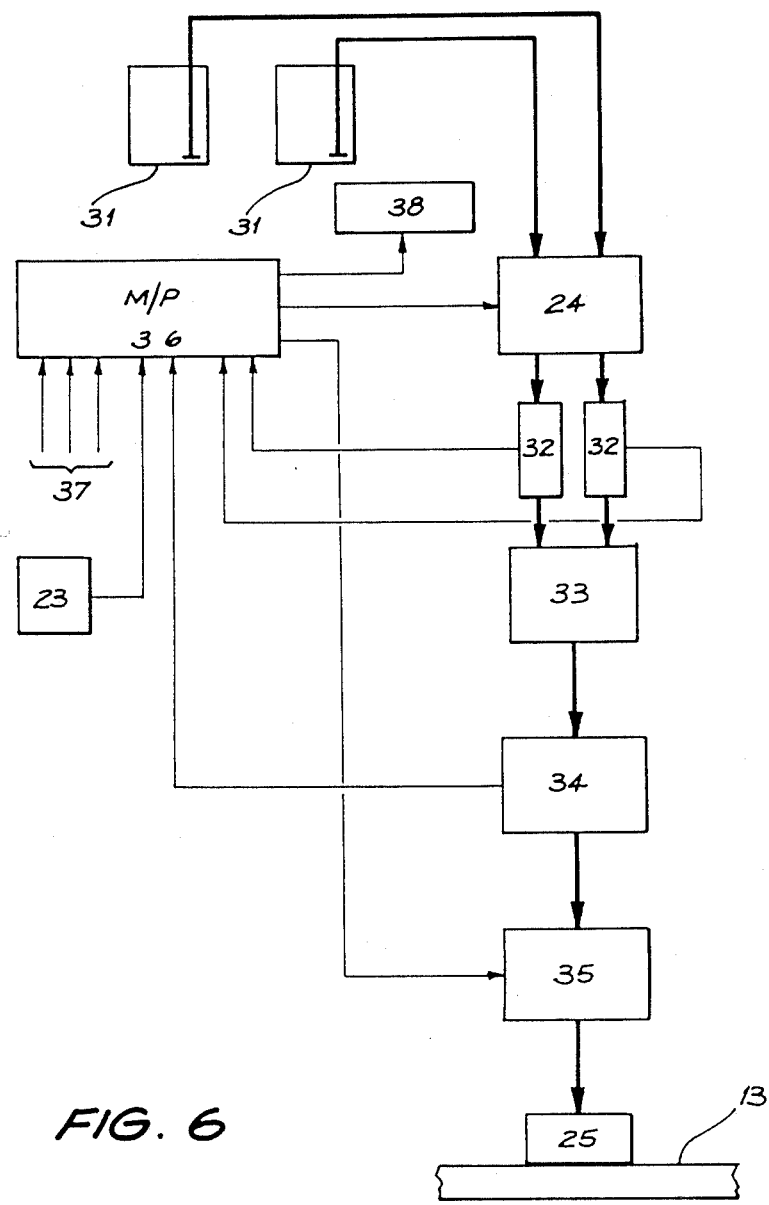
FIG. 6 shows a schematic diagram of fluid circuit components of the apparatus.

A liquid delivery line 29 connects with the inlet port 26 and serves to provide the distributor 25 with liquid from a reservoir 30 (as indicated in FIG. 1) or from a plurality of drums 31 (as indicated in FIG. 6).

In the circuit as shown in FIG. 6, two different concentrate liquids, for example two insecticides which provide for broad spectrum protection, are drawn from the two drums 31 by the perastaltic pump 24. The desired mix ratio of the two liquids is determined by the relative ratio of occluded volumes of the tubes that are used to carry the liquids to and through the pump 24.

The two liquids are directed through respective flowmeters 32, into a mixing chamber 33, and thereafter through a pressure transducer 34. The pressure transducer serves to detect for excessive back pressure within the circuit and, thus, to sense the presence of any blockage in the line 29.

After passing through the pressure transducer 34, the blended liquids flow through a solenoid actuated valve 39 and then to the distributor 25. The solenoid valve is energised to preclude residual fluid flow when grain is sensed to be not present on the conveyor.

Control of the pump 24 is effected by a microprocessor 36, with inputs to the microprocessor being derived from the control device 23, the flowmeters 32 and the pressure transducer 34. Other inputs 37, which are not specifically indicated in FIG. 6, are fed to the microprocessor to provide a measure of the conveyor velocity, the load on the conveyor and the insecticide dosing requirements for the grain.

An alarm device 38 may also be incorporated in the circuit to provide for visual and/or audible indication of blockages or other malfunctions in the system.

We claim:

1. An apparatus for applying a fluid by direct contact to a material which is carried by a conveyor, the apparatus comprising a flap device located adjacent the conveyor and positioned to continuously contact material carried by or discharged from the conveyor, a distributor extending across at least a portion of the width of the flap device and arranged in use of the apparatus to direct fluid into the material which is contacted by the flap device, means for delivering the fluid to the distributor, and means for sensing the existence of material on the conveyor and means for admitting the fluid to the distributor responsive to the sensing means sensing material present on the conveyor.

2. The apparatus as claimed in claim 1 wherein the flap device is located above the conveyor and is positioned to overlie the conveyor whereby material on the conveyor contacts the underside of the flap device.

3. The apparatus as claimed in claim 2 wherein the flap device is pivotably mounted at one of its ends to a supporting structure and wherein means are provided for detecting pivotal movement of the flap device and thereby sensing the presence of material on the conveyor.

4. The apparatus as claimed in claim 2 wherein the flap device is formed at least in part from a sheet of resilient flexible material and wherein the supporting structure is positioned above the conveyor in a manner such that the flap device follows a curved path in extending downwardly from the supporting structure toward the conveyor.

5. The apparatus as claimed in claim 4 wherein the upper surface of an end portion of the flap device which is remote from the supporting structure is clad with a flat sheet of relatively rigid material whereby that end portion of the flap device is maintained in a substantially flat condition.

6. The apparatus as claimed in claim 5 wherein the flap device is pivotably mounted to the supporting structure by way of a rod, the rod being connected at one end to the flat sheet and being also connected to said one end of the flap device by means permitting relative movement between the rod and said one end of the flap device.

7. The apparatus as claimed claim 2 wherein the distributor includes a series of distribution channels which open to an edge of the distributor which lies substantially flush with the lower surface of the flap device.

8. The apparatus as claimed in claim 7 wherein the distributor is removably mounted within a recess in the flap device.

9. A method of applying a fluid to a bulk material which is carried by a conveyor, comprising conveying the bulk material, directing the fluid into the material by way of a distributor mounted to a pivotable flap device, the flap device being located adjacent the conveyor, contacting the material carried by or delivered from the conveyor with the flap device, sensing the material on the conveyor with the flap device, and delivering the fluid to the distributor responsive to the material being sensed by the flap device to be present on the conveyor.

* * * * *